(12) United States Patent
Chueh (10) Patent No.: US 11,454,712 B2
(45) Date of Patent: Sep. 27, 2022

(54) TIME-OF-FLIGHT DISTANCE MEASURING SYSTEM AND CALIBRATION METHOD

(71) Applicant: SHENZHEN GOODIX TECHNOLOGY CO., LTD., Guangdong (CN)

(72) Inventor: Shengchun Chueh, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 534 days.

(21) Appl. No.: 16/657,928

(22) Filed: Oct. 18, 2019

(65) Prior Publication Data

US 2020/0049803 A1 Feb. 13, 2020

Related U.S. Application Data

(63) Continuation of application No. PCT/CN2018/096170, filed on Jul. 18, 2018.

(51) Int. Cl.
*G01S 17/10* (2020.01)
*G01S 7/4865* (2020.01)
(Continued)

(52) U.S. Cl.
CPC .............. *G01S 7/4865* (2013.01); *G01C 3/08* (2013.01); *G01S 7/4863* (2013.01); *G01S 7/497* (2013.01);
(Continued)

(58) Field of Classification Search
CPC ...... G01S 7/4865; G01S 7/4863; G01S 17/10; G01S 17/36; G01S 17/89; G01C 3/08
(Continued)

(56) References Cited

U.S. PATENT DOCUMENTS

| 8,368,876 B1 | 2/2013 | Johnson et al. |
| 2010/0128109 A1 | 5/2010 | Banks |

(Continued)

FOREIGN PATENT DOCUMENTS

| CN | 1094515 A | 11/1994 |
| CN | 1831561 A | 9/2006 |

(Continued)

OTHER PUBLICATIONS

English Abstract Translation of Foreign Reference CN107820572A.
(Continued)

*Primary Examiner* — Nguyen T Truong
(74) *Attorney, Agent, or Firm* — WPAT, P.C., Intellectual Property Attorneys; Anthony King (57) ABSTRACT

The present application provides a time-of-flight distance measuring system (10), including a delay unit (12) configured to generate a plurality of delayed pulses according to a plurality of delay signals, wherein the plurality of delay signals correspond to a plurality of delay times; a light-emitting unit (13), configured to generate a plurality of delayed pulsed lights according to the plurality of delayed pulses; a photosensitive pixel circuit (14), configured to receive a plurality of delayed reflected lights to generate a plurality of pixel signals; a storage unit (16), configured to store a correspondence between the plurality of delay times and the plurality of pixel signals; and a control unit (18), configured to generate the plurality of delay signals; wherein, the time-of-flight distance measuring system performs a time-of-flight distance measuring according to the correspondence between the plurality of delay times and the plurality of pixel signals.

13 Claims, 7 Drawing Sheets

(51) Int. Cl.
*G01C 3/08* (2006.01)
*G01S 7/4863* (2020.01)
*G01S 7/497* (2006.01)
*G01S 17/36* (2006.01)
*G01S 17/89* (2020.01)

(52) U.S. Cl.
CPC .............. *G01S 17/10* (2013.01); *G01S 17/36* (2013.01); *G01S 17/89* (2013.01)

(58) Field of Classification Search
USPC ...................................................... 356/5.01
See application file for complete search history.

(56) References Cited

U.S. PATENT DOCUMENTS

| | | | |
|---|---|---|---|
| 2012/0194798 | A1 | 8/2012 | Crawford et al. |
| 2016/0061941 | A1 | 3/2016 | Guo et al. |
| 2016/0363654 | A1 | 12/2016 | Wyland |

FOREIGN PATENT DOCUMENTS

| | | |
|---|---|---|
| CN | 101449181 | 6/2009 |
| CN | 102549380 A | 7/2012 |
| CN | 103472457 A | 12/2013 |
| CN | 103616696 A | 3/2014 |
| CN | 104823071 A | 8/2015 |
| CN | 104884972 A | 9/2015 |
| CN | 105204032 | 12/2015 |
| CN | 105277943 A | 1/2016 |
| CN | 105607072 A | 5/2016 |
| CN | 105607072 A | 5/2016 |
| CN | 106443692 A | 2/2017 |
| CN | 107452760 A | 12/2017 |
| CN | 107820572 A | 3/2018 |
| CN | 107820572 A | 3/2018 |
| CN | 105572681 | 6/2018 |

OTHER PUBLICATIONS

English Abstract Translation of Foreign Reference CN105607072A.
English Abstract Translation of Foreign Reference CN107452760A.
English Abstract Translation of Foreign Reference CN105204032.
English Abstract Translation of Foreign Reference CN105572681.
English Abstract Translation of Foreign Reference CN104884972A.
English Abstract Translation of Foreign Reference CN101449181.
English Abstract Translation of Foreign Reference CN103472457A.
English Abstract Translation of Foreign Reference CN103616696A.
English Abstract Translation of Foreign Reference CN102549380A.
International Search Report in Chinese (Form PCT/ISA/210).
English Translaiton of the Original Specificiation.
English Abstract Translation of CN1094515A.
English Abstract Translation of CN1831561A.
English Abstract Translation of CN104823071A.
English Abstract Translation of CN105277943A.
English Abstract Translation of CN105607072A.
English Abstract Translation of CN106443692A.
English Abstract Translation of CN107820572A.

- 700 — the control unit 18 computes the optimal delay time $t_{d,opt}$ according to the correspondence between the plurality of delay times $t_{d,1} \sim t_{d,n}$ and the plurality of pixel signals $p_1 \sim p_n$, and generates the optimal delay signal $ds_{opt}$ to the delay unit 12 corresponding to optimal delay time $t_{d,opt}$

- 702 — the delay unit 12 generates the optimal delayed pulses $dp_{opt}$ according to the optimal delayed pulse signal $ds_{opt}$

- 704 — the light-emitting unit 13 generates the optimal delayed pulsed lights $LD_{opt}$ according to the optimal delayed pulses $dp_{opt}$

- 706 — the photosensitive pixel circuit 140 receives the optimal delayed reflected light $R_{opt}$ corresponding to the optimal delayed pulsed lights $LD_{opt}$ and generates the optimal delayed pixel signal $p_{opt}$ corresponding to the optimal delay time $t_{d,opt}$ according to the optimal delayed reflected light $R_{opt}$

- 708 — the time-of-flight system 10 computes the time-of-flight distance corresponding to the target object according to the optimal delayed pixel signal $p_{opt}$

FIG. 7

TIME-OF-FLIGHT DISTANCE MEASURING SYSTEM AND CALIBRATION METHOD

CROSS REFERENCE TO RELATED APPLICATIONS

The present application is a continuation of international application No. PCT/CN2018/096170, filed on Jul. 18, 2018, which is hereby incorporated by reference in its entirety.

TECHNICAL FIELD

The present application is related to a time-of-flight distance measuring system and calibration method; in particular, to and a time-of-flight distance measuring system and calibration method capable of avoiding offset.

BACKGROUND

With the rapid development of science and technology, the acquisition of the three-dimensional (3D) information of an object has a wide variety of application potential in many application fields, such as production automation, human-machine interaction, medical diagnosis, reverse engineering, digital modeling, etc. The structural light 3D measurement is a contactless 3D information acquisition technique, and has been widely used because of advantages such as easy-to-implement, fast speed and high accuracy.

The time-of-flight (ToF) technology is a commonly used 3D depth measuring method. However, the current time-of-flight distance measuring system has many shortcomings. For example, two conduction times of two transmission gates of photosensitive pixel circuits applied in the tune-of-flight shall be separated by a time interval, or pulse transferred to light-emitting units may be a non-ideal continuous square wave, thereby resulting in an offset between distance, measured by the time-of-flight technique, and actual distance.

In view of the foregoing, there is a need in the related art for further improvement.

BRIEF SUMMARY OF THE INVENTION

In view of the foregoing, the purpose of some embodiments of the present disclosure is to provide a tune-of-flight distance measuring system and calibration method capable of avoiding offset, so as to address the disadvantages in the existing art.

To address the above-mentioned technical issues, embodiments of the present application provides a time-of-flight distance measuring system, which comprises a delay unit that receives a plurality of delay signals and is configured to generate a plurality of delayed pulses according to a plurality of delay signals, wherein the plurality of delay signals correspond to a plurality of delay times; a light-emitting unit, coupled to the delay unit and configured to generate a plurality of delayed pulsed lights according to the plurality of delayed pulses; a photosensitive pixel circuit, configured to receive a plurality of delayed reflected lights corresponding to the plurality of delayed pulsed lights to generate a plurality of pixel signals corresponding to the plurality of delay times; a storage unit, configured to store a correspondence between the plurality of delay times and the plurality of pixel signals; and a control unit, coupled to the delay unit and configured to generate the plurality of delay signals; wherein, the time-of-flight distance measuring system performs a time-of-flight distance measuring according to the correspondence between the plurality of delay times and the plurality of pixel signals.

For example, the control unit generates an optimal delay signal to the delay unit according to the correspondence between the plurality of delay times and the plurality of pixel signals, and the time-of-flight distance measuring system performs the time-of-flight distance measuring according to the optimal delay signal, wherein the optimal delay signal corresponds to an optimal delay time.

For example, the delay unit generates an optimal delayed pulse according to the optimal delay signal, the light-emitting unit generates an optimal delayed pulsed light according to the optimal delayed pulse, the photosensitive pixel circuit receives the optimal delayed reflected light corresponding to the optimal delayed pulsed light to generate an optimal delayed pixel signal, and the time-of-flight distance measuring system computes a time-of-flight distance corresponding to a target object according to the optimal delayed pixel signal.

For example, the plurality of delayed reflected lights are reflected from the reflector, and there is a fixed distance between the reflector and the time-of-flight distance measuring system.

For example, the photosensitive pixel circuit comprises a photosensitive device; a first readout circuit, which comprises a first transmission gate, wherein the first transmission gate is coupled to the photosensitive device, and the first transmission gate receives a first transmission signal and is conducted at a first conduction time; and a second readout circuit, which comprises a second transmission gate, wherein the second transmission gate is coupled to the photosensitive device, and the second transmission gate receives a second transmission signal and is conducted at a second conduction time, wherein the second readout circuit outputs the plurality of pixel signals; wherein, the first conduction time and the second conduction time are separated by a time interval.

To address the above-mentioned technical issues, embodiments of the present application further provide a calibration method for a time-of-flight distance measuring system, wherein the calibration method comprises generating a plurality of delay signals, wherein the plurality of delay signals correspond to a plurality of delay times; generating a plurality of delayed pulses according to the plurality of delay signals, emitting a plurality of delayed pulsed lights corresponding to the plurality of delayed pulses; receive a plurality of delayed reflected lights corresponding to the plurality of delayed pulsed lights to generate a plurality of pixel signals corresponding to the plurality of delay times; storing a correspondence between the plurality of delay times and the plurality of pixel signals; and performing a time-of-flight distance measuring according to the correspondence between the plurality of delay times and the plurality of pixel signals.

To address the above-mentioned technical issues, embodiments of the present application further provides a time-of-flight distance measuring method, applied in a time-of-flight distance measuring system, wherein the time-of-flight distance measuring method comprises, obtaining a correspondence between a plurality of delay times and a plurality of pixel signals; and performing a time-of-flight distance measuring according to the correspondence between the plurality of delay times and the plurality of pixel signals, wherein, the correspondence between the plurality of delay times and the plurality of pixel signals is obtained by a time-of-flight calibration method and stored in the time-of-flight distance measuring system, and the time-of-flight calibration method comprises, generating a plurality of delay signals, wherein the plurality of delay signals correspond to a plurality of delay times; generating a plurality of delayed pulses according to the plurality of delay signals; emitting a plurality of delayed pulsed lights corresponding to the plurality of delayed pulses; receive a plurality of delayed reflected lights corresponding to the plurality of delayed pulsed lights to generate a plurality of pixel signals corresponding to the plurality of delay times; and outputting the correspondence between the plurality of delay times and the plurality of pixel signals.

By emitting a plurality of delayed pulsed lights corresponding to different delay times, the present disclosure simulates different simulation distances between the time-of-flight distance measuring system and the reflector so as to obtain a correspondence between the simulation distance and the measured distance, and performs the time-of-flight distance measuring according to said correspondence. As compared with the prior art, the calibration stage of the present application obtains the correspondence between the simulation distance and the measured distance without human operation, and the present application is advantages in its easy-to-operate and capability of obtaining an accurate time-of-flight distance.

DETAILED DESCRIPTION

To further explain the purposes, technical solutions and advantages of the present application, the appended drawings and embodiments are discussed below to give a detailed description of the present disclosure. It should be noted that the embodiments provided herein are used to explain the present disclosure, and shall not be used to limit the present application.

Figure 1:
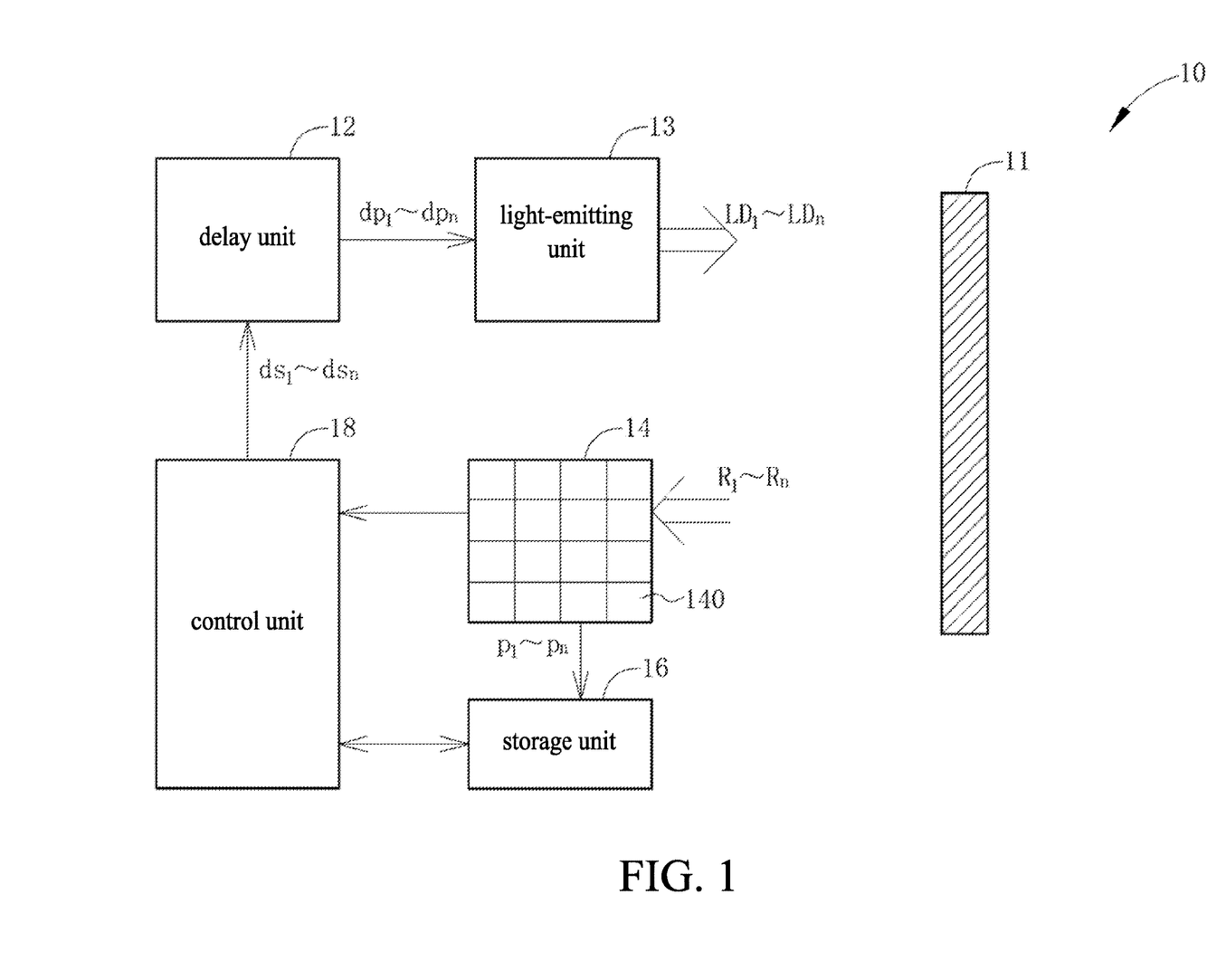
FIG. 1 is a schematic diagram of a time-of-flight distance measuring system according to embodiments of the present application.

Please refer to FIG. 1, FIG. 1 is a schematic diagram of a time-of-flight (TOF) system 10 according to embodiments of the present application. The time-of-flight distance measuring system 10 comprises a delay unit 12, a light-emitting unit 13, a photosensitive pixel array 14, and a storage unit 16 and a control unit 18. During a calibration stage of the time-of-flight distance measuring system 10, a reflector 11 is disposed at a position that is apart from the time-of-flight distance measuring system 10 with a known fixed distance GD, and the light-emitting unit 13 emits light toward the reflector 11 and the photosensitive pixel array 14 receives reflected light from the reflector 11.

Specifically, during the calibration stage, the control unit 18 generates a plurality of delay signals $ds_1 \sim ds_n$ to the delay unit 12, wherein the plurality of delay signals $ds_1 \sim ds_n$ respectively correspond to a plurality of delay times $t_{d,1} \sim t_{d,n}$. In other words, the delay signals $ds_1 \sim ds_n$ are signals used to represent the delay times $t_{d,1} \sim t_{d,n}$, or the delay signals $ds_1 \sim ds_n$ include information corresponding to the delay times $t_{d,1} \sim t_{d,n}$. The delay unit 12 receives the plurality of delay signals $ds_1 \sim ds_n$, and generates a plurality of delayed pulses $dp_1 \sim dp_n$ according to the plurality of delay signals $ds_1 \sim ds_n$, whereas the delayed pulses $dp_1 \sim dp_n$ correspond to the delay times $t_{d,1} \sim t_{d,n}$. The light-emitting unit 13 may be a light-emitting diode (LED), such as an infrared ray (IR) LED. The light-emitting unit 13 is coupled to the delay unit 12 to receive the delayed pulses $dp_1 \sim dp_n$, and is configured to, according to delayed pulses $dp_1 \sim dp_n$, generate a plurality of delayed pulsed lights $LD_1 \sim LD_n$, which is corresponding to delayed pulses $dp_1 \sim dp_n$, at time intervals $T_1 \sim T_n$, respectively. In this case, delayed pulses $dp_1 \sim dp_n$, may form a delayed pulse signal DP (that is, the delayed pulse signal DP consists of a plurality of delayed pulses $dp_1 \sim dp_n$, which is described below). The light-emitting unit 13 can be used to receive the delayed pulse signal DP to generate delayed pulsed lights $LD_1 \sim LD_n$. The delayed pulsed lights $LD_1 \sim LD_n$ is emitted toward the reflector 11, whereas the reflector 11 reflects a plurality of delayed reflected lights $R_1 \sim R_n$ to the photosensitive pixel array 14, wherein there is a known fixed distance GD between the reflector 11 and the time-of-flight distance measuring system 10. The photosensitive pixel array 14 comprises a plurality of photosensitive pixel circuits 140, and the plurality of the photosensitive pixel circuits 140 are arranged in an array. Without losing generality, the following description uses one photosensitive pixel circuit 140 in the photosensitive pixel array 14 as an example. The photosensitive pixel circuit 140 receives a plurality of delayed reflected lights $R_1 \sim R_n$ corresponding to a plurality of delayed pulsed lights $LD_1 \sim LD_n$ during time intervals $T_1 \sim T_n$, and generates a plurality of pixel signals $p_1 \sim p_n$ corresponding to the plurality of delay times $t_{d,1} \sim t_{d,n}$ according to the delayed reflected lights $R_1 \sim R_n$, wherein the plurality of pixel signals $p_1 \sim p_n$ form one output signal. The storage unit 16 is configured to store a correspondence between the plurality of delay times $t_{d,1} \sim t_{d,n}$ and the plurality of pixel signals $p_1 \sim p_n$.

During a distance measuring stage of the time-of-flight distance measuring system 10, the light-emitting unit 13 no longer emits light toward the reflector 11, but emits light toward an object to be measured or a target object to be measured. At this time, the time-of-flight distance measuring system 10 may use the correspondence between the plurality of delay times $t_{d,1} \sim t_{d,n}$ and the plurality of pixel signals $p_1 \sim p_n$ stored by the storage unit 16 to perform TOF on the target object.

Figure 2:
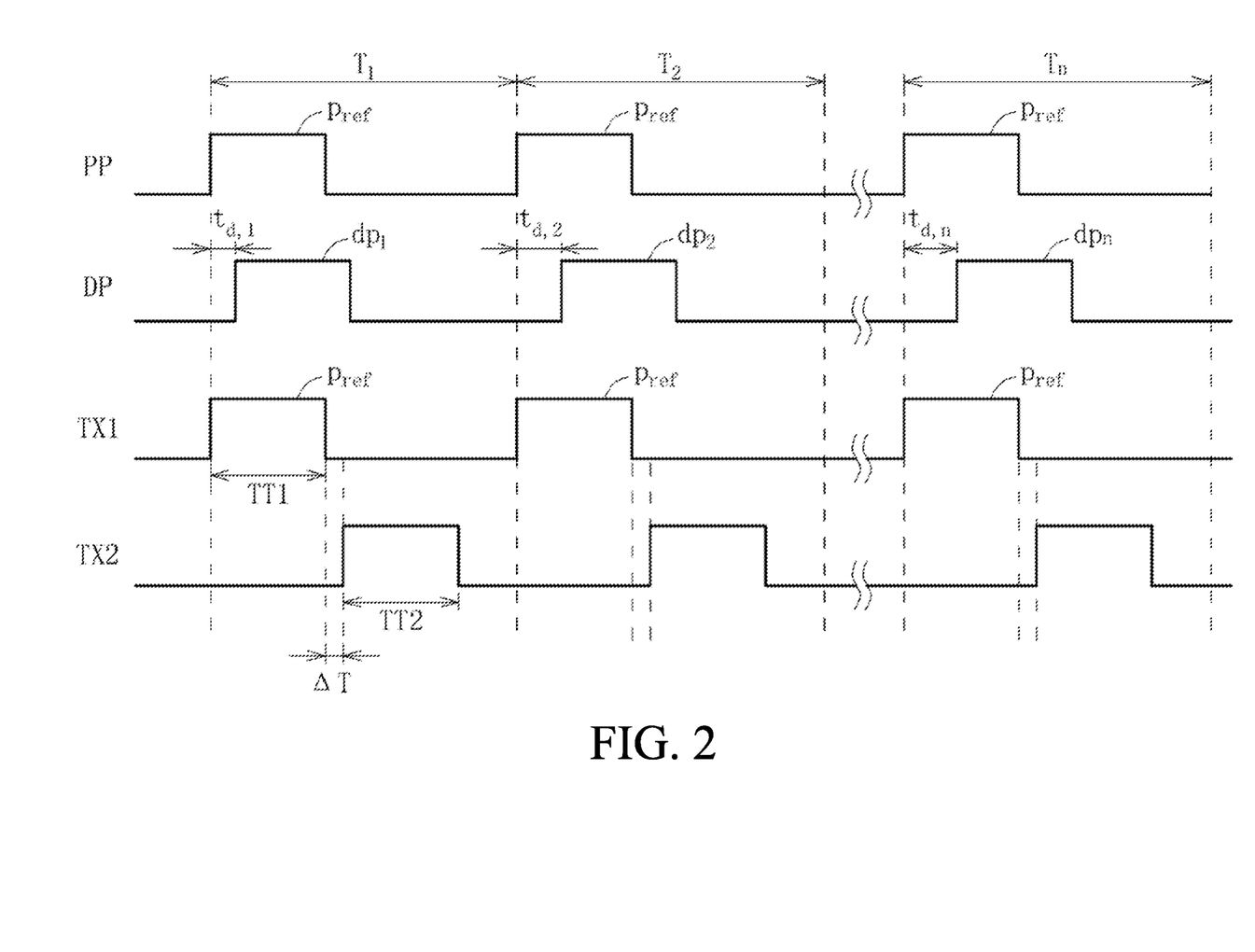
FIG. 2 is a timing diagram of a plurality of signals according to embodiments of the present application.

Please refer to FIG. 2, FIG. 2 is a timing diagram of a first pulse signal PP and a delayed pulse signal DP according to embodiments of the present application, wherein the first pulse signal PP may be used as a reference object for the delayed pulse signal DP. The delayed pulse signal DP has delayed pulses $dp_1 \sim dp_n$, and the first pulse signal PP may have one reference pulse $p_{ref}$ individually during time intervals $T_1 \sim T_n$. That is, a plurality of reference pulses $p_{ref}$ may form the first pulse signal PP, wherein the time intervals $T_1 \sim T_n$ may have the same length of time. The delayed pulses $dp_1 \sim dp_n$ may have delay times $t_{d,1} \sim t_{d,n}$ with respect to the reference pulses $p_{ref}$. For example, rising edges of the delayed pulses $dp_1 \sim dp_n$ have delay times $t_{d,1} \sim t_{d,n}$ with respect to rising edges of the reference pulses $p_{ref}$, respectively. Alternatively, falling edges of the delayed pulses $dp_1$~$dp_n$ have delay times $t_{d,1}$~$t_{d,n}$ with respect to the falling edges of the reference pulse $p_{ref}$, respectively. In this case, the delayed pulses $dp_1$~$dp_n$ and the reference pulses $p_{ref}$ may have the same pulse width and pulse amplitude.

Moreover, during the calibration stage, the light-emitting unit 13 receives the delayed pulse signal DP and emits delayed pulsed lights $LD_1$~$LD_n$ according to delayed pulse signal DP during time intervals $T_1$~$T_n$, respectively, whereas the photosensitive pixel circuit 140 may receive delayed reflected lights $R_1$~$R_n$ during time intervals $T_1$~$T_n$, respectively.

Figure 3:
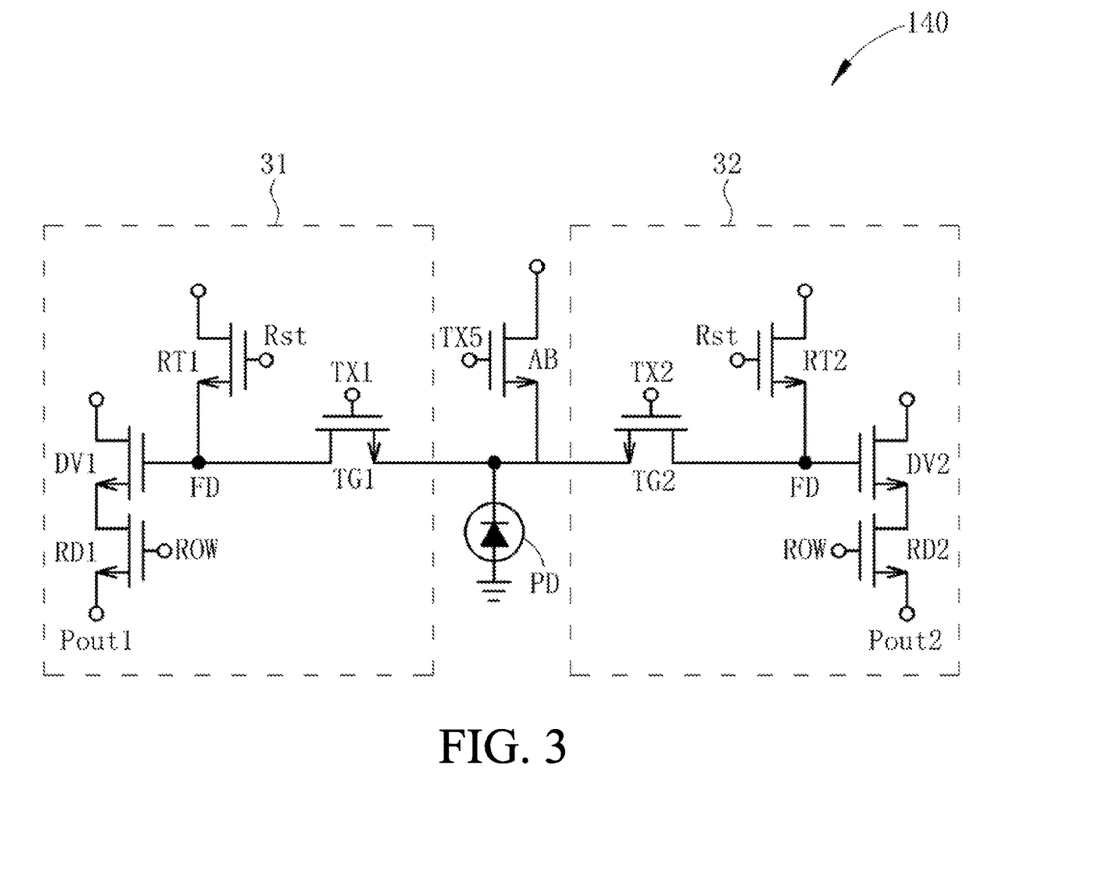
FIG. 3 is a schematic diagram of a photosensitive pixel circuit according to embodiments of the present application.

Operation of the photosensitive pixel circuit 140 applied in TOF is known to persons having ordinary skill in the art, and is briefly discussed below. Please refer to FIG. 3, FIG. 3 is a schematic diagram of the photosensitive pixel circuit 140 according to embodiments of the present application. The photosensitive pixel circuit 140 comprises a photosensitive device PD, and photoelectric readout circuits 31 and 32, wherein the photosensitive device PD may be a photo diode. The photoelectric readout circuit 31 comprises a transmission gate TG1, an output transistor DV1 and a reading transistor RD1. The photoelectric readout circuit 32 comprises a transmission gate TG2, an output transistor DV2 and a reading transistor RD2. The transmission gates TG1 and TG2 are coupled to the photosensitive device PD. The output transistors DV1 and DV2 are coupled to the transmission gates TG1 and TG2, respectively. The reading transistors RD1 and RD2 are coupled to the output transistors DV1 and DV2, respectively, and output the first output signal Pout1 and the second output signal Pout2, respectively. The transmission gates TG1 and TG2 receive transmission signals TX1 and TX2, respectively. The reading transistors RD1 and RD2 receive a row selection signal ROW. When the row selection signal ROW controls the reading transistors RD1 and RD2 to conduct the reading transistors RD1 and RD2, the photosensitive pixel circuit 140 outputs the output signals Pout1 and Pout2. The photoelectric readout circuits 31 and 32 further comprise, respectively, reset transistors RT1 and RT2, wherein the reset transistors RT1 and RT2 receive a reset signal Rst. When the reset signal Rst controls the reset transistors RT1 and RT2 to conduct the reset transistors RT1 and RT2, electric charges at a floating diffusion node FD is able be cleared. The photosensitive pixel circuit 140 further comprises an anti-blooming transistor AB, wherein the anti-blooming transistor AB is under the control of an anti-blooming signal TX5. When the anti-blooming signal TX5 controls the anti-blooming transistor AB to conduct, photoelectrons generated by the photosensitive device PD because of the receipt of a background light are drained, so as to avoid affecting a normal operation of a circuit. In this case, in some embodiments, the signals TX1, TX2, Rst, ROW and TX5 may be generated by the control unit (illustrated in FIG. 1) of the time-of-flight distance measuring system 10.

Please refer to FIG. 2 again, FIG. 2 additionally illustrates a timing diagram of the transmission signals TX1 and TX2 according to embodiments of the present application. As shown in FIG. 2, the transmission gate TG1 is under the control of the transmission signal TX1 so that the transmission gate TG1 is conducted at a conduction time TT1. The transmission gate TG2 is under the control of the transmission signal TX2 so that the transmission gate TG2 is conducted at a conduction time TT2, wherein the conduction time TT1 and the conduction time TT2 are separated by a time interval ΔT. ΔT may be a fixed time interval or a non-fixed time interval. During the time intervals $T_1$~$T_n$ (i.e., periodically), the transmission signal TX1 individually may have a reference pulse $p_{ref}$. That is, the transmission signal TX1 may have the same timing or waveform as the first pulse signal PP. From another perspective, the delay times $t_{d,1}$~$t_{d,n}$ may be the delay times of the delayed pulses $dp_1$~$dp_n$ with respect to the reference pulse $p_{ref}$ of the transmission signal TX1.

Moreover, the pixel signals $p_1$~$p_n$ outputted by the photosensitive pixel circuit 140 may relate to the first output signal Pout1 or the second output signal Pout2. Since the time-of-flight distance measuring system 10 computes the distance mainly according to the relative ratio between the first output signal Pout1 and the second output signal Pout2, and the second output signal Pout2 is positively proportional to the distance computed by using TOF. That is, the second output signal Pout2 is positively proportional to the time-of-flight of light. The relationship between the pixel signals $p_1$~$p_n$ and the second output signal Pout2 is used as an example in the following embodiments. Furthermore, pixel signals $p_1$~$p_n$ may be a plurality of signal values of the second output signal Pout2 during the time intervals $T_1$~$T_n$, respectively. That is, during the time intervals $T_1$~$T_n$, the photosensitive device PD respectively receives the plurality of delayed reflected lights $R_1$~$R_n$ and since the delayed pulses $dp_1$~$dp_n$ have different time differences (respectively related to delay times $t_{d,1}$~$t_{d,n}$) with respect to the conduction time TT2 of the transmission gate TG2, the second output signal Pout2 outputted by the photoelectric readout circuit 32 during the time intervals $T_1$~$T_n$ include a plurality of pixel signals $p_1$~$p_n$, and the plurality of pixel signals $p_1$~$p_n$ respectively correspond to the plurality of delay times $t_{d,1}$~$t_{d,n}$.

The storage unit 16 may store a correspondence between the delay times $t_{d,1}$~$t_{d,n}$ and the pixel signals $p_1$~$p_n$, directly. Additionally, the time-of-flight distance measuring system 10 may estimate simulation distances $d_1$~$d_n$ according to a known fixed distance GD and the delay times $t_{d,1}$~$t_{d,n}$, and estimate measured distances $d_1'$~$d_n'$ according to the pixel signals $p_1$~$p_n$, whereas the storage unit 16 may indirectly store the correspondence between store delay times $t_{d,1}$~$t_{d,n}$ and pixel signals $p_1$~$p_n$ by storing the correspondence between simulation distances $d_1$~$d_n$ and measured distances $d_1'$~$d_n'$. In this example, simulation distances $d_1$~$d_n$ may be a fixed distance GD plus the distance that light propagate with light speed during time $t_{d,1}$~$t_{d,n}$. The measured distances $d_1'$~$d_n'$ may be the time-of-flight distance computed by TOF according to the plurality of second output signals Pout2 corresponding to the time intervals $T_1$~$T_n$, and the measured distance does not necessarily equal to an actual distance.

Moreover, sine the simulation distances $d_1$~$d_n$ and the times $t_{d,1}$~$t_{d,n}$ are substantially in a linear relationship and since the pixel signals $p_1$~$p_n$ and measured distances $d_1'$~$d_n'$ are substantially in a linear relationship, the correspondence between the delay times $t_{d,1}$~$t_{d,n}$ and the pixel signals $p_1$~$p_n$ is equivalent to the correspondence between the simulation distances $d_1$~$d_n$ and the measured distances $d_1'$~$d_n'$.

Figure 4:
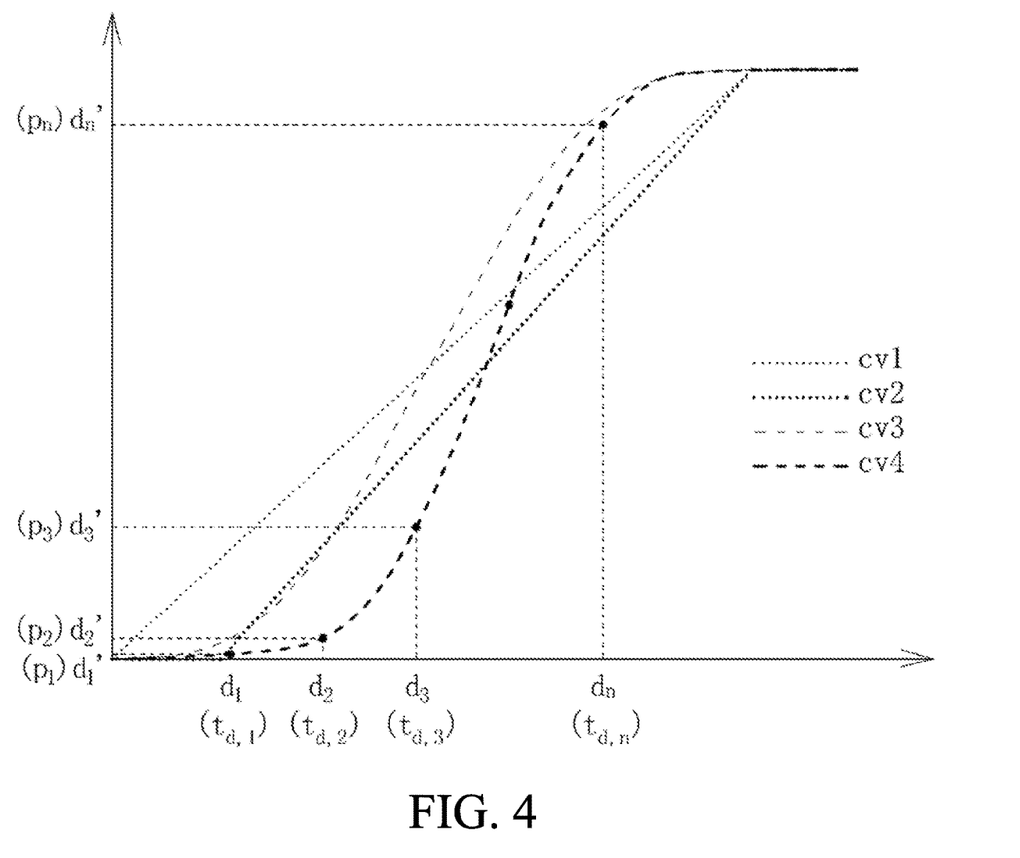
FIG. 4 is a schematic diagram of a plurality of corresponding curves according to embodiments of the present application.
Figure 5:
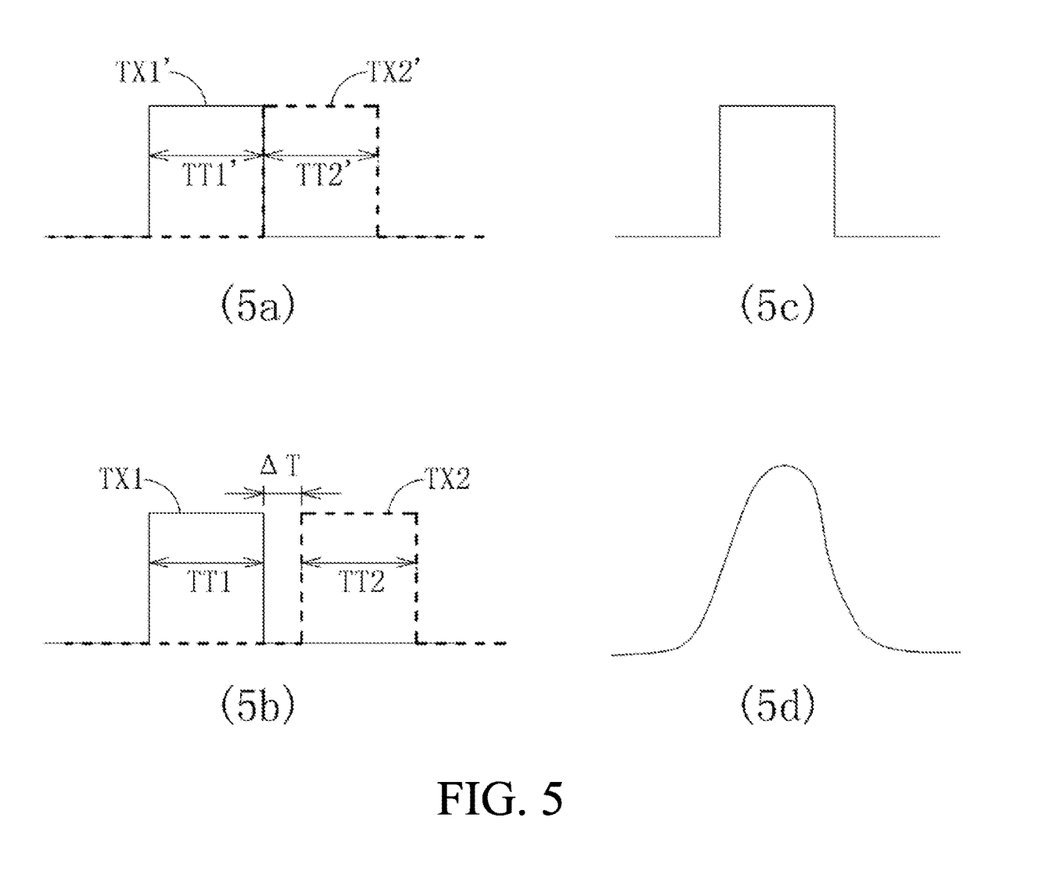
FIG. 5 is an waveform diagram of a plurality of signals according to embodiments of the present application.

Please refer to FIGS. 4 and 5; FIG. 4 is a schematic diagram illustrating a plurality of curves showing the relationship between the actual/simulation distance and the measured distance, wherein these curves represent the correspondence between the delay times and pixel signals. Subfigure 5a in FIG. 5 is a waveform diagram showing the transmission signal TX1' received by the transmission gate TG1 and the transmission signal TX2' received by the transmission gate TG1 when there is seamless between the conduction time TT1' of the transmission gate TG1 in the photosensitive pixel circuit 140 and the conduction time TT2' of the transmission gate TG2. Subfigure 5*b* is a waveform diagram showing the transmission signal TX1 received by the transmission gate TG1 and the transmission signal TX2 received by the transmission gate TG1 when there is time interval ΔT between the conduction time TT1 of the transmission gate TG1 and the conduction time 172 of the transmission gate TG2. Subfigure 5*c* is a waveform diagram of an ideal non-continuous square wave outputted to the delayed pulses $dp_1$~$dp_n$. Subfigure 5*d* is a waveform diagram of a non-ideal continuous square wave outputted to the delayed pulses $dp_1$~$dp_n$.

Moreover, in FIG. 4, the curve cv1 is a curve showing the correspondence between the actual/simulation distance and the measured distance when there is seamless between the conduction time TT1' of the transmission gate TG1 and the conduction time TT2' of the transmission gate TG2, in which ΔT=0 (that is, the transmission gates TG1 and TG2 in FIG. 3 receive the transmission signals TX1' and TX2' illustrated in Subfigure 5*a*) and the delayed pulses $dp_1$~$dp_n$ are the ideal non-continuous square wave illustrated in Subfigure 5*c*. The curve cv2 is a curve showing the correspondence between the actual/simulation distance and the measured distance when there is a non-zero time interval ΔT between the conduction time TT1 of the transmission gate TG1 and the conduction time TT2 of the transmission gate TG2 (that is, the transmission gates TG1 and TG2 receive the transmission signals TX1 and TX2 illustrated in Subfigure 5*b*/FIG. 2), and the delayed pulses $dp_1$~$dp_n$ are the ideal non-continuous square wave illustrated in Subfigure 5*c*. The curve cv3 is a curve showing the correspondence between the actual/simulation distance and the measured distance when there is seamless between the conduction time TT1' of the transmission gate TG1 and the conduction time TT2' of the transmission gate TG2 (corresponding to Subfigure 5*a*), and the delayed pulses $dp_1$~$dp_n$ are the non-ideal continuous square wave illustrated in Subfigure 5*d*. The curve cv4 is a curve showing the correspondence between the actual/simulation distance and the measured distance when there is a non-zero time interval ΔT (corresponding to Subfigure 5*b*) between the conduction time TT1 of the transmission gate TG1 and the conduction time TT2 of the transmission gate TG2, and the delayed pulses $dp_1$~$dp_n$ are the non-ideal continuous square wave illustrated in Subfigure 5*d*. In this case, the actual distance is the distance between the time-of-flight distance measuring system 10 and the object to be measured (which may be the target object or the reflector). Moreover, the curves cv1~cv4 may also be the curves representing the correspondence between the delay times and pixel signals.

Moreover, the correspondence between the delay times $t_{d,1}$~$t_{d,n}$ and pixel signals $p_1$~$p_n$ or the correspondence between the simulation distances $d_1$~$d_n$ and the measured distances $d_1'$~$d_n'$ that is stored by the storage unit 16 may be represented by a plurality of discrete points on the curve cv4 in FIG. 4. For example, the correspondence between $d_1$~$d_n$ and $d_1'$~$d_n'$ may be expressed as the ratio between the horizontal-axis coordinate and the vertical-axis coordinate of the discrete points.

As can be seen in FIG. 4, under an optimal circumstance (corresponding to circumstance associated with the curve cv1), the measured distance computed by the time-of-flight distance measuring system will equal the actual distance between the time-of-flight distance measuring system and the object to be measured. In reality, when designing the circuits, wirings are required to be taken into consideration. There has to be a certain time interval ΔT (that is, ΔT is non-zero) between the conduction time TT1 of the transmission gate TG1 and the conduction time TT2 of the transmission gate TG2. On the other hand, when transition times of the delayed pulses $dp_1$~$dp_n$ is non-negligible or comparable with respect to pulse width, the delayed pulses $dp_1$~$dp_n$ exhibit waveforms as shown in Subfigure 5*d*. Considering the foregoing realistic factors, the curve cv4 has an offset with respect to the curve cv1. That is, the measured distance computed by the time-of-flight distance measuring system does not equal the actual distance between the time-of-flight distance measuring system and the object to be measured.

In order to avoid the offset, during a calibration stage of the prior art, a staff responsible for calibration shall constantly move the reflector to change the distance between the time-of-flight distance measuring system and the reflector, so as to obtain the plurality of discrete points of the curve cv4 in FIG. 4. The existing calibration method involves manual operation (the distance between the time-of-flight distance measuring system and the reflector is changed manually), thereby causing inconvenience to a technician. In comparison, the present disclosure simulates different simulation distances $d_1$~$d_n$ between the time-of-flight distance measuring system 10 and the reflector 11 under the premise that the distance GD between the time-of-flight distance measuring system 10 and the reflector 11 is fixed, so as to obtain the plurality of discrete points at the curve cv4 in FIG. 4. In some embodiments, the time-of-flight distance measuring system 10 may, according to the plurality of discrete points at the curve cv4, use interpolation to obtain the curve cv4.

In this way, during the distance measuring stage (after obtaining the curve cv4), the time-of-flight distance measuring system 10 may obtain the actual distance between the time-of-flight distance measuring system 10 and the target object (which may refer to the horizontal axis in FIG. 4; in this case, the actual distance is the distance obtained by referring to the horizontal axis in the curve cv4 with the second output signal Pout2 obtained in the distance measuring stage) by referring to the curve cv4 with the second output signal Pout2 (referring to the vertical axis in FIG. 4) obtained in the distance measuring stage (outputted by the photoelectric readout circuit 32 in the photosensitive pixel circuit 140).

Figure 6:
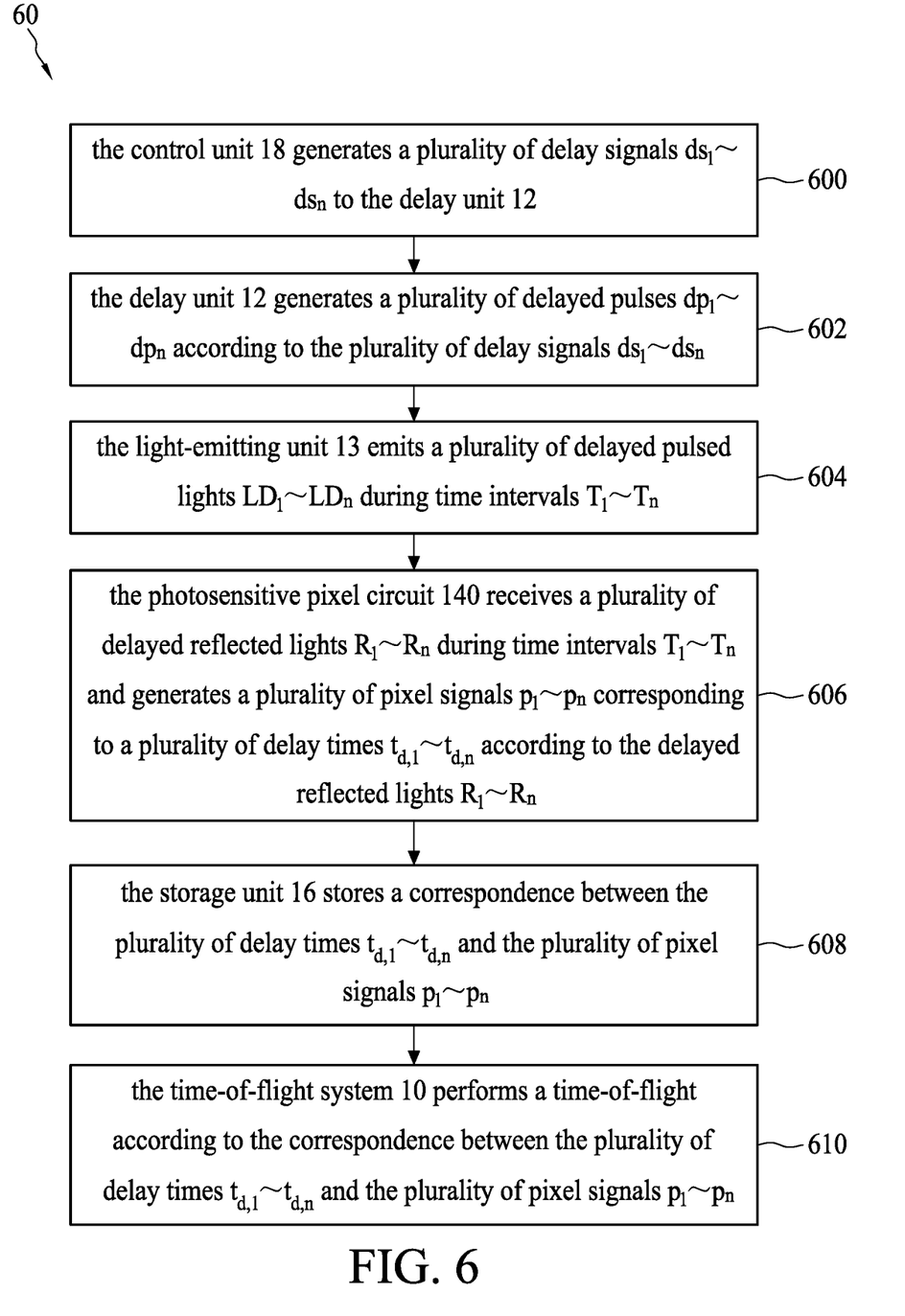
FIG. 6 is a flowchart of a process according to embodiments of the present application.

Operation of the time-of-flight distance measuring system 10 may be summarized as a process. Please refer to FIG. 6, which is a schematic diagram of a process 60 according to embodiments of the present application. The process 60 comprises the following steps:

Step 600: the control unit 18 generates a plurality of delay signals $ds_1$~$ds_n$ to the delay unit 12.

Step 602: the delay unit 12 generates a plurality of delayed pulses $dp_1$~$dp_n$ according to the plurality of delay signals $ds_1$~$ds_n$.

Step 604: the light-emitting unit 13 emits a plurality of delayed pulsed lights $LD_1$~$LD_n$ during time intervals $T_1$~$T_n$.

Step 606: the photosensitive pixel circuit 140 receives a plurality of delayed reflected lights $R_1$~$R_n$ during time intervals $T_1$~$T_n$ and generates, according to the delayed reflected lights $R_1$~$R_n$, a plurality of pixel signals $p_1$~$p_n$ corresponding to a plurality of delay times $t_{d,1}$~$t_{d,n}$.

Step 608: the storage unit 16 stores a correspondence between the plurality of delay times $t_{d,1}$~$t_{d,n}$ and the plurality of pixel signals $p_1$~$p_n$.

Step 610: the time-of-flight distance measuring system 10 performs a time-of-flight distance measuring according to the correspondence between the plurality of delay times $t_{d,1} \sim t_{d,n}$ and the plurality of pixel signals $p_1 \sim p_n$.

For the details regarding the process 60, please refer to the relevant paragraphs above, and a repeated description is omitted herein. In this case, Steps 600~608 may belong to the calibration stage carried out before the device leaves the factory, and Step 610 may be the actual distance measuring stage carried out after the device leaves the factory.

The foregoing embodiments are only used to illustrate the concept of the disclosure of the present application, and persons having ordinary skill in the art can made various modifications thereto, and the present disclosure is not limited thereto. For example, in Step 610, the time-of-flight distance measuring system 10 may compute a more linear segment (the linear segment, for short) of an optimal delay time $t_{d,opt}$ (or the corresponding simulation distance thereof) in the middle of the curve cv4 according to the curve cv4, so that the measured distance computed by the time-of-flight distance measuring system 10 according to the time-of-flight distance measuring method is closer to the actual distance between the time-of-flight distance measuring system 10 and the target object.

Figure 7:
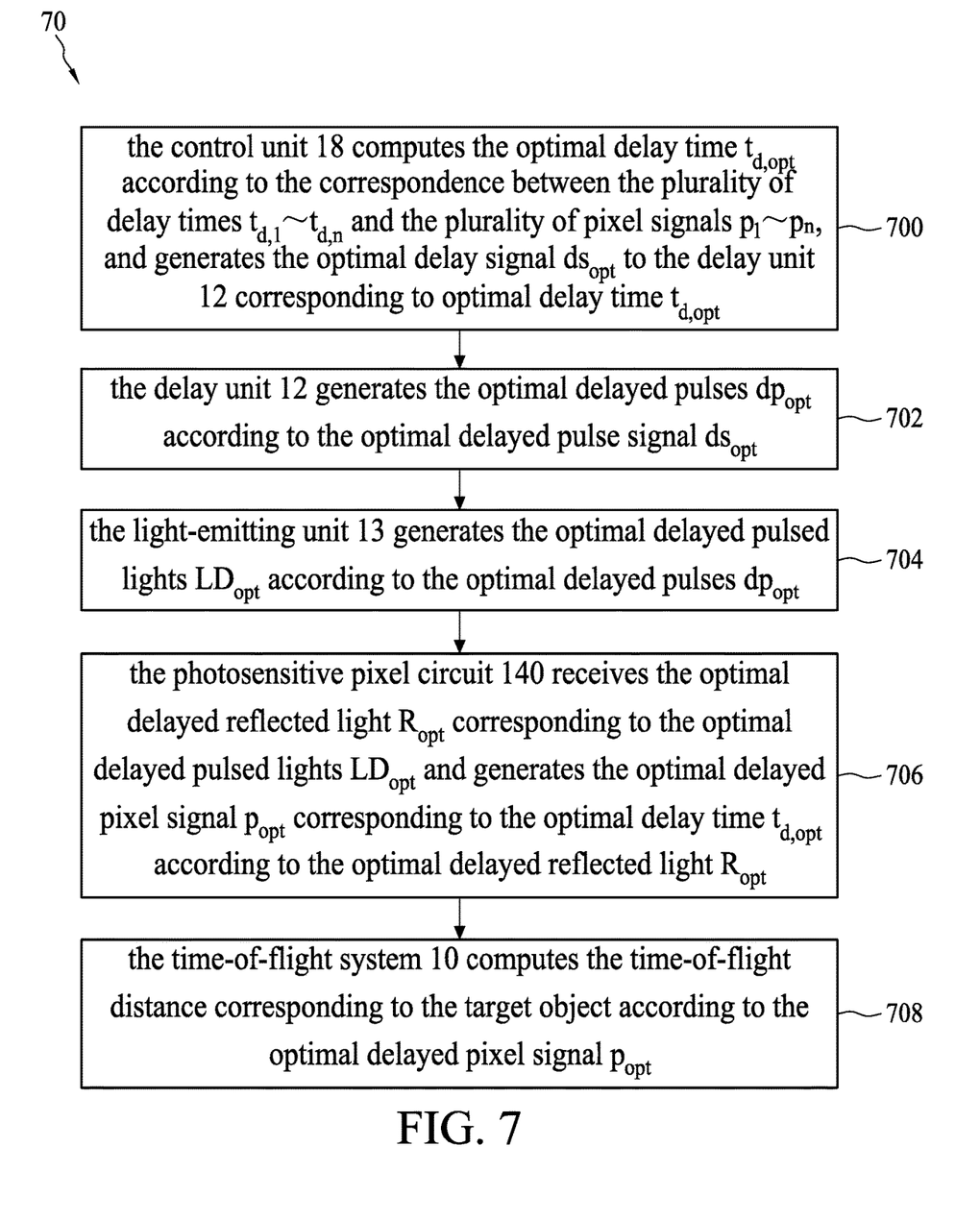
FIG. 7 is a flowchart of a process according to embodiments of the present application.

Regarding the details of how the time-of-flight distance measuring system 10 computes the optimal delay time $t_{d,opt}$ and performs time-of-flight according to the optimal delay time $t_{d,opt}$, please refer to FIG. 7. FIG. 7 is a flowchart of a process 70 according to embodiments of the present application. The process 70 comprises the following steps:

Step 700: the control unit 18 computes the optimal delay time $t_{d,opt}$ according to the correspondence between the plurality of delay times $t_{d,1} \sim t_{d,n}$ and the plurality of pixel signals $p_1 \sim p_n$, and generates the optimal delay signal $ds_{opt}$, which corresponds to optimal delay time $t_{d,opt}$, to the delay unit 12.

Step 702: the delay unit 12 generates the optimal delayed pulses $dp_{opt}$ according to the optimal delayed pulse signal $ds_{opt}$.

Step 704: the light-emitting unit 13 generates the optimal delayed pulsed lights $LD_{opt}$ according to the optimal delayed pulses $dp_{opt}$.

Step 706: the photosensitive pixel circuit 140 receives the optimal delayed reflected light $R_{opt}$ corresponding to the optimal delayed pulsed lights $LD_{opt}$, and generates, according to the optimal delayed reflected light $R_{opt}$, the optimal delayed pixel signal $p_{opt}$ corresponding to the optimal delay time $t_{d,opt}$.

Step 708: the time-of-flight distance measuring system 10, according to the optimal delayed pixel signal $p_{opt}$, computes the time-of-flight distance corresponding to the target object.

In Step 702, the optimal delay time $t_{d,opt}$ may be the delay time of the optimal delayed pulse $dp_{opt}$ with respect to the reference pulse $p_{ref}$ in the transmission signal TX1. In Step 708, the optimal delayed pixel signal $p_{opt}$ is the second output signal Pout2 outputted correspondingly by the photoelectric readout circuit 32 in the photosensitive pixel circuit 140 when the photosensitive pixel circuit 140 receives the optimal delayed reflected light $R_{opt}$. The details of the computation of the time-of-flight distance corresponding to the target object according to the second output signal Pout2 are known to persons having ordinary skill in the art, and a repeated description is omitted herein. The remainder of the details with respect to the process 70 is similar to that of the process 60, and a repeated description is omitted herein.

In view of the foregoing, by emitting a plurality of delayed pulsed lights corresponding to different delay times, the present disclosure simulates different simulation distances between the time-of-flight distance measuring system and the reflector so as to obtain a correspondence between the simulation distance and the measured distance, and performs time-of-flight according to said correspondence. As compared with the prior art, the calibration stage of the present application obtains the correspondence between the simulation distance and the measured distance without human operation, and the present application is advantages in its easy-to-operate and capability of obtaining an accurate time-of-flight distance.

The foregoing outlines a portion of embodiments of the present disclosure, and shall not be used to limit the present application; any modification, equivalent substitution or improvement made within the spirits and principles of the present application shall be included in the scope of protection of the present application.

What is claimed is:

1. A time-of-flight distance measuring system, comprising:
    a delay unit, receiving a plurality of delay signals and configured to generate a plurality of delayed pulses according to the plurality of delay signals, wherein the plurality of delay signals correspond to a plurality of delay times;
    a light-emitting unit, coupled to the delay unit and configured to generate a plurality of delayed pulsed lights according to the plurality of delayed pulses;
    a photosensitive pixel circuit, configured to receive a plurality of delayed reflected lights corresponding to the plurality of delayed pulsed lights to generate a plurality of pixel signals corresponding to the plurality of delay times;
    a storage unit, configured to store a correspondence between the plurality of delay times and the plurality of pixel signals; and
    a control unit, coupled to the delay unit and configured to generate the plurality of delay signals;
    wherein the time-of-flight distance measuring system performs a time-of-flight distance measuring according to the correspondence between the plurality of delay times and the plurality of pixel signals.

2. The time-of-flight distance measuring system of claim 1, wherein the control unit generates an optimal delay signal to the delay unit according to the correspondence between the plurality of delay times and the plurality of pixel signals, and the time-of-flight distance measuring system performs the time-of-flight distance measuring according to the optimal delay signal, wherein the optimal delay signal corresponds to an optimal delay time.

3. The time-of-flight distance measuring system of claim 2, wherein the delay unit generates an optimal delayed pulse according to the optimal delay signal, the light-emitting unit generates an optimal delayed pulsed light according to the optimal delayed pulse, the photosensitive pixel circuit receives an optimal delayed reflected light corresponding to the optimal delayed pulsed light to generate an optimal delayed pixel signal, and the time-of-flight distance measuring system computes a time-of-flight distance corresponding to a target object according to the optimal delayed pixel signal.

4. The time-of-flight distance measuring system of claim 1, wherein the plurality of delayed reflected lights are reflected from a reflector, wherein there is a fixed distance between the reflector and the time-of-flight distance measuring system.

5. The time-of-flight distance measuring system of claim 1, wherein the photosensitive pixel circuit comprises:
- a photosensitive device;
- a first readout circuit, comprising a first transmission gate, wherein the first transmission gate is coupled to the photosensitive device, and the first transmission gate receives the first transmission signal and is conducted at a first conduction time; and
- a second readout circuit, comprising a second transmission gate, wherein the second transmission gate is coupled to the photosensitive device, and the second transmission gate receives the second transmission signal and is conducted at a second conduction time, wherein the second readout circuit outputs the plurality of pixel signals;
- wherein the first conduction time and the second conduction time are separated by a time interval.

6. A calibration method for a time-of-flight distance measuring system, the calibration method comprising:
- generating a plurality of delay signals, wherein the plurality of delay signals correspond to a plurality of delay times;
- generating a plurality of delayed pulses according to the plurality of delay signals;
- emitting a plurality of delayed pulsed lights corresponding to the plurality of delayed pulses;
- receiving a plurality of delayed reflected lights corresponding to the plurality of delayed pulsed lights to generate a plurality of pixel signals corresponding to the plurality of delay times;
- storing a correspondence between the plurality of delay times and the plurality of pixel signals; and
- performing a time-of-flight distance measuring according to the correspondence between the plurality of delay times and the plurality of pixel signals.

7. The calibration method of claim 6, wherein the step of performing the time-of-flight distance measuring according to the correspondence between the plurality of delay times and the plurality of pixel signals comprises:
- generating an optimal delay signal to a delay unit according to the correspondence between the plurality of delay times and the plurality of pixel signals, wherein the optimal delay signal corresponds to an optimal delay time; and
- performing the time-of-flight distance measuring according to the optimal delay signal.

8. The calibration method of claim 7, wherein the step of performing the time-of-flight distance measuring according to the optimal delay signal comprises:
- generating an optimal delayed pulse according to the optimal delay signal;
- generating an optimal delayed pulsed light according to the optimal delayed pulse;
- receiving an optimal delayed reflected light corresponding to the optimal delayed pulsed light to generate the optimal delayed pixel signal; and
- computing a time-of-flight distance corresponding to a target object according to the optimal delayed pixel signal.

9. The calibration method of claim 6, wherein the plurality of delayed reflected lights are reflected from a reflector, wherein there is a fixed distance between the reflector and the time-of-flight distance measuring system.

10. A time-of-flight distance measuring method for a time-of-flight distance measuring system, the time-of-flight distance measuring method comprising:
- obtaining a correspondence between a plurality of delay times and a plurality of pixel signals; and
- performing a time-of-flight distance measuring according to the correspondence between the plurality of delay times and the plurality of pixel signals, wherein the correspondence between the plurality of delay times and the plurality of pixel signals is obtained through a time-of-flight calibration method and stored in the time-of-flight distance measuring system, and the time-of-flight calibration method comprises:
- generating a plurality of delay signals, wherein the plurality of delay signals correspond to the plurality of delay times;
- generating a plurality of delayed pulses according to the plurality of delay signals;
- emitting a plurality of delayed pulsed lights corresponding to the plurality of delayed pulses;
- receiving a plurality of delayed reflected lights corresponding to the plurality of delayed pulsed lights to generate the plurality of pixel signals corresponding to the plurality of delay times; and
- outputting the correspondence between the plurality of delay times and the plurality of pixel signals.

11. The time-of-flight distance measuring method according to claim 10, wherein the step of performing the time-of-flight distance measuring according to the correspondence between the plurality of delay times and the plurality of pixel signals comprises:
- generating an optimal delay signal to a delay unit according to the correspondence between the plurality of delay times and the plurality of pixel signals, wherein the optimal delay signal corresponds to an optimal delay time; and
- performing the time-of-flight distance measuring according to the optimal delay signal.

12. The time-of-flight distance measuring method according to claim 11, wherein the step of performing the time-of-flight distance measuring according to the optimal delay signal comprises:
- generating an optimal delayed pulse according to the optimal delay signal;
- generating an optimal delayed pulsed light according to the optimal delayed pulse;
- receiving an optimal delayed reflected light corresponding to the optimal delayed pulsed light to generate the optimal delayed pixel signal; and
- computing a time-of-flight distance corresponding to a target object according to the optimal delayed pixel signal.

13. The time-of-flight distance measuring method according to claim 10, wherein the plurality of delayed reflected lights are reflected from a reflector, wherein there is a fixed distance between the reflector and the time-of-flight distance measuring system.

* * * * *